United States Patent [19]

Ronen

[11] 4,356,501

[45] Oct. 26, 1982

[54] INTEGRATED SILICON NIB FOR AN ELECTROSTATIC PRINTER

[75] Inventor: Ram S. Ronen, Placentia, Calif.

[73] Assignee: Xerox Corporation, Stamford, Conn.

[21] Appl. No.: 95,872

[22] Filed: Nov. 19, 1979

[51] Int. Cl.³ .............................................. G01D 15/06

[52] U.S. Cl. .................................. 346/155; 346/139 C

[58] Field of Search ................ 346/155, 139 C, 153.1, 346/162; 360/121

[56] References Cited

U.S. PATENT DOCUMENTS

| | | | |
|---|---|---|---|
| 3,795,010 | 2/1974 | King | 346/155 |
| 3,979,758 | 9/1976 | Kilby | 346/155 |
| 4,005,436 | 1/1977 | Kleinknachi | 346/155 |
| 4,180,824 | 12/1979 | Yvard | 346/155 |
| 4,219,927 | 9/1980 | Fukutomi | 346/155 |
| 4,233,611 | 11/1980 | Nakano | 346/155 |
| 4,237,469 | 12/1980 | Gustin | 346/155 |

*Primary Examiner*—Alan Faber

[57] ABSTRACT

Nibs formed as doped lines on a substrate operative to function as a writing head for a non-impact high voltage electrostatic printer. The doped lined styli may be defined with conventional integrated circuit photolithography for increased scratch protection and reduced wearout.

3 Claims, 16 Drawing Figures

INTEGRATED SILICON NIB FOR AN ELECTROSTATIC PRINTER

CROSS-REFERENCE TO OTHER APPLICATIONS AND PATENTS

A patent application entitled "High Voltage MOS-FET System Structure" bearing U.S. Ser. No. 43,853 and filed on May 30, 1979 now abandoned, by Ram S. Ronen and assigned to Xerox Corporation describes and claims the system of drivers and addressing logic operative to interface with the inventive nibs formed on the writing head chip.

BACKGROUND OF THE INVENTION

1. Field of the Invention

This invention relates to the field of direct marking electrostatic printing and more particularly to nibs or styli formed photolithographically, by plating, or by selective deposition of conducting materials.

2. Prior Art

Previously, on a writing head for an electrostatic printer, thin wires were placed through preformed holes in a dielectric block at a density of 100 nibs or styli per linear inch with an internib distance of 10 mils. The separate dielectric blocks including discrete components were interconnected in hybrid form which is a labor intensive process and thus a relatively expensive approach.

Alternatively, nibs could be applied at the end of a printer circuit board, either single or double sideably for single or double resolution respectively. Although both of the above structures have represented state of the art technology, there exists a need for writing head structures capable of much greater nib resolution while at the same time being amendable to standard LSI fabrication for greater manufacturing cost efficiencies.

SUMMARY OF THE INVENTION

It is an important object of the invention to provide nibs formed as conductive lines on a substrate able to function as a writing head having styli for an electrostatic printer.

It is another object of the invention to provide multiple arrays of the nibs, each succeeding array relatively slightly off-set as to its precedent for effectively higher resolution.

It is a further object of the invention to enable and provide the driver circuitry on the same chip and relatively proximate to the nibs for decreased load capacitance.

BRIEF DESCRIPTION OF THE DRAWINGS

Various other objects, advantages and meritorious features of the invention will become more fully apparent from the following specification, appended claims and accompanying drawing sheets.

The features of a specific embodiment of the invention are illustrated in the drawings in which.

DESCRIPTION OF THE PREFERRED EMBODIMENT

Referring to FIGS. 1 through 11 by the characters of reference there is illustrated an apparatus using the integrated silicon nibs for carrying out the objects of the invention.

Figure 1:
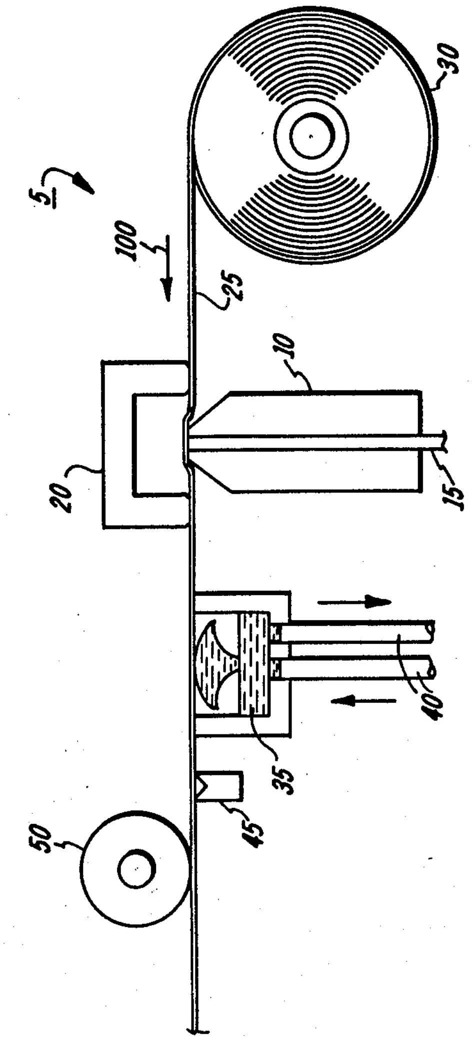
FIG. 1 is a block diagram of an electrostatic writing mechanism.
Figure 2:
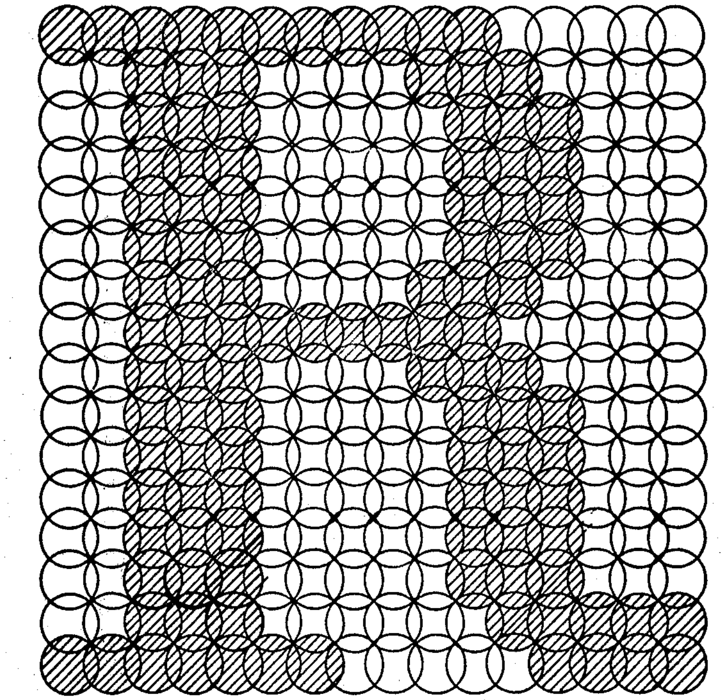
FIG. 2 is a representation of a 16×16 dot matrix character as printed by the mechanism of FIG. 1.

In a convention embodiment in an electrostatic printer or plotter 5, as shown in FIG. 1, a writing head 10, which contains two rows or arrays of densely spaced styli or nibs or electrodes 15 (normally 100 per linear inch), and a segmented backplate electrode 20, is selectively programmed by the plotter logic (not shown) to place minute dot-sized electrostatic charges on the media or paper 25 fed from a supply drum 30 where the paper 25 is driven by assembly 50. A specifically coated dielectric paper or media 25 is used which is capable of temporarily storing these electrostatic charges. After data is written on the paper 25 using electrostatic charges, the paper 25 is exposed to a liquid toner 35 from an applicator 40. Black particles suspended in the toner 35 adhere to the paper 25 only where a previous electrostatic charge was written or applied. Excessive toner 35 is removed from the paper 25 by a vacuum from a channel 45 and the paper 25 is then dried by forced air (not shown). The resultant copy or paper 25 is ready for immediate use.

Figure 3:
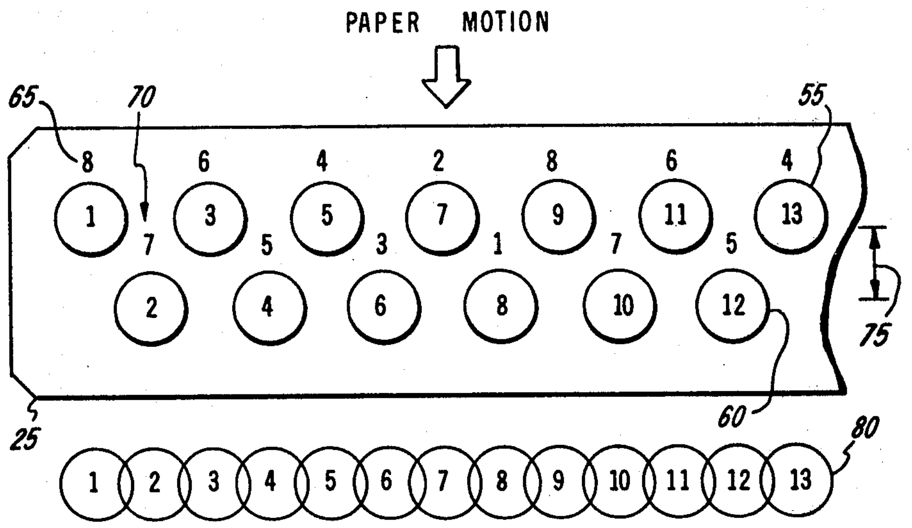
FIG. 3 is a representation of the writing process for a dual writing head of the mechanism of FIG. 1.

The printer/plotter 5 uses the raster scan method of writing. One horizontal line or scan, consisting of a single row of dots, is written. The paper 25 is then incremented slightly, another scan is written, and so forth. By programming each scan, any type of graphic design can be outputted, including shaded graphics and alphanumerics of any size. Printer and printer/plotter models 5 have internal circuitry (not shown) which converts ASC11-coded characters to pre-programmed plot patterns. These patterns produce a sharply defined alpha-numeric character set. Each character is formed by either a 7×9 dot or 16×16 dot matrix, FIG. 2, depending on the model 5 selected. The SPP (simultaneous print/plot) option permits overlaying of print characters with plot data. In an exemplary mode, the printer/plotter 5 may utilize a dual array writing head 10 which writes each scan using overlapping dots. As shown in FIG. 3, the first nib row 55 is offset with respect to the second row 60. Even data bits (65) are applied to the first row of nibs 55 and are written on the paper 25. The odd numbered data bits 70 are not applied to the second row of nibs 60 until the paper 25 moves a distance of two scans 75 (the fixed distance separating the first 55 and second nib rows 60 in the head 10). The resultant output pattern is a single row of overlapping dots 80.

Figure 4A:
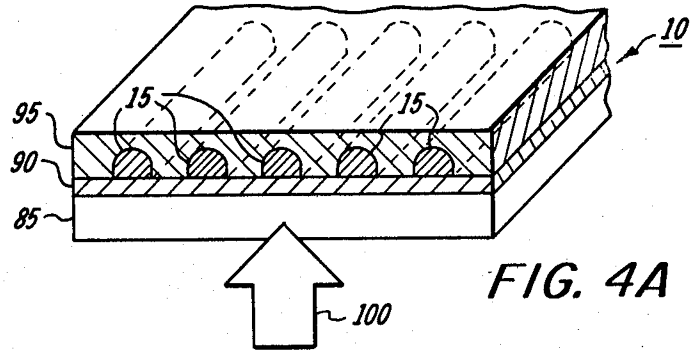
FIG. 4A is a cross-sectional view of the inventive writing head structure having integrated circuit formed exposed nibs as used in the mechanism of FIG. 1.
Figure 4B:
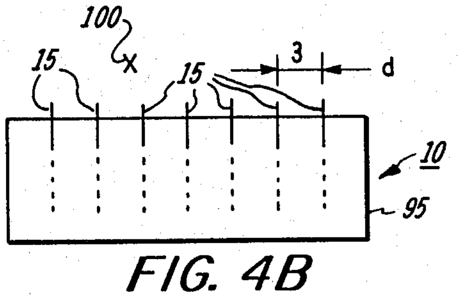
FIG. 4B is an overhead view of the writing head structure of FIG. 4.

In the present invention, nibs 15 are integrated into a silicon chip along with a system of drivers and addressing logic 110 as a writing head 10. It will be appreciated that the system 110 could be on seperate chip(s) relative to the chip that the nibs 15 are on where a relatively higher load capacitance could be tolerated. Looking at a particular embodiment for frontal view in FIG. 4A and a top view in FIG. 4B of the nibs 15, the associated structure of the writing head 10 comprises a silicon or ceramic substrate 85. In addition, it includes an overlay of a dielectric 90 such as $SiO_2$ or $Si_3N_4$. Deposited or fabricated on the overlay 90, are doped polysilicon lines or metal lines/conductive lines functioning as an array overlay of nibs 15 interspaced at 5–10 mils using conventional IC photolithographic techniques. Finally over the nib array 15 is an optional second dielectric overlay of $SiO_2$, $Si_3N_4$ or glass/quartz 95 for scratch or abrasion protection for the nibs 15 and also oxidating passivation said same nibs 15. It will be appreciated that the paper flow direction 100 relative to the array of nibs in the writing head 10 is as shown in FIGS. 4A–B. It will be further appreciated that the nibs 15 may be polysilicon or a hard metal such as tungsten.

Figure 5:
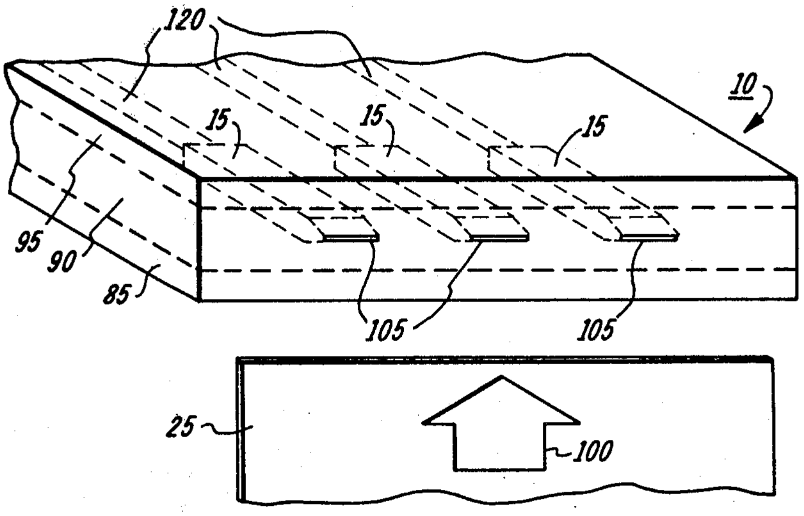
FIG. 5 is an perspective view of the writing head structure of FIG. 4B that has been magnified to show the pointed nibs.

The advantages of the above writing head structure 10 include ease of definition for the lines functioning as nibs 15 when using IC photolithography. Moreover grown thermal $SiO_2$ dielectric layer 90 offers lower load capacitance and dielectric layer 95 offers exceptional oxidation passivation relative to nibs and scratch resistance thereby relatively obviating abrasive/frictional wearout. Likewise, by bringing the lines of nibs 15 to a point in one plane 105, where they operate as nibs 15, high local-E field concentration can be achieved while allowing for a lower discharge voltage similar to a lightning rod effect as shown in FIG. 5. It will be appreciated that for an exemplary embodiment of 500 nib lines per inch, a minimum width of 25 μm or the nib lines themselves with 25 μm interspatial would be required.

Figure 6:
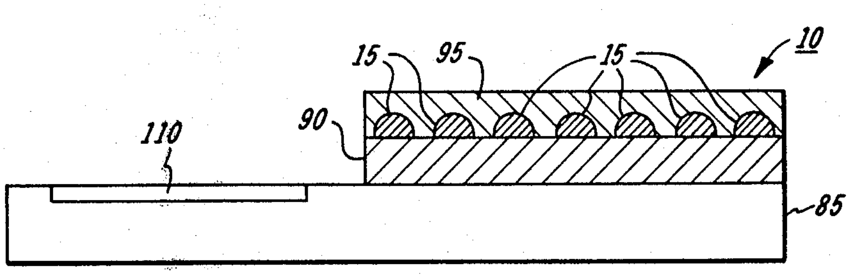
FIG. 6 is a cross-sectional view of the writing head structure of FIG. 1 including the driver circuitry and nib array.

Per the supra cross referenced application on a switch array system for a writing head 10 such as described and claimed for the present invention, such a system of drivers and addressing logic 110 may be relatively closely proximately located to the nib lines 15 on the same substrate 85 as shown in FIG. 6 or on seperate chips as mentioned supra. The lines of nibs 15 may be spatially placed on a relatively thick oxide for isolation while the electronics encompassed by the array of drivers and the associated LV logic known as system 110 may be deposited on or fabricated in the substrate itself 85. It will be appreciated that the monolithic silicon writing head 10 and its included system 110 could all be in LV form with equal validity in regards to its functioning. It will be further appreciated that proximity of system 110 to nib array 15 allows for relatively low load capacitance and thus lower driver voltage through nibs 15. Thus relatively smaller driver transistors in the system 110 will be needed, and driver voltage level changes can be effected quickly. For $P=CV^2$, lower capacitance load means less power required for charging and discharging and less time required to charge up the capacitance and thus a faster reaction time for driving nibs on and off.

The main process for making the supra described embodiment including the writing head structure 10 having the array of nibs 15 comprises the infra steps. Following that, a description of various alternative processes will be given for complementary embodiments.

Figure 7A:
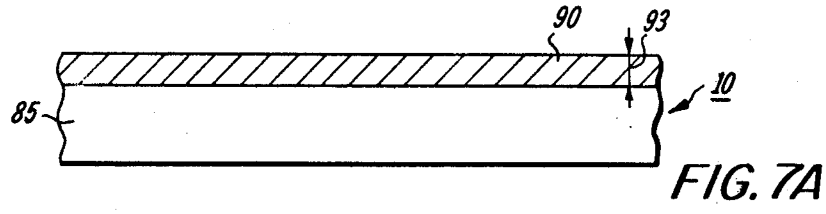
FIGS. 7 A–E is a cross-sectional view of a resolution N deposited single sided array for the nibs of the writing head structure.
Figure 7B:
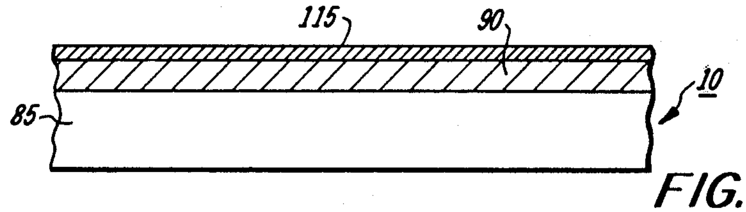
Figure 7C:
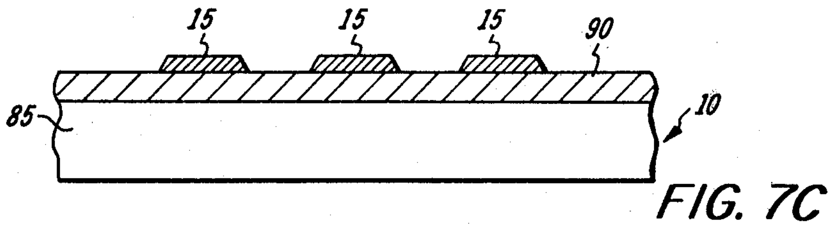
Figure 7D:
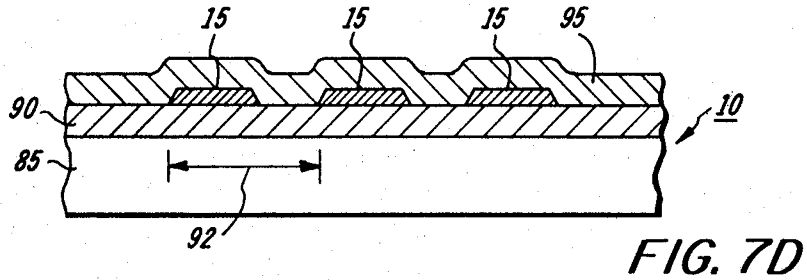

As shown in side view FIG. 7A, for an unisided, unilayered deposited single array of nibs 15 having resultion N, a clean silicon wafer may have an insulating oxide such as $SiO_2$ or $Si_2N_3$ for isolation purposes grown on it as a layer 90 described supra in the structure as the first dielectric layer overlay 90. The layer 90 may be relatively thick or greater than 4 μm as an example. Next, as shown in side view FIG. 7B, a polysilicon layer 115 or other appropriate conductor such as Mo or W may be deposited. The polysilicon may be doped to give the desired conductivity. It will be appreciated that the use of a crystalline material such as polysilicon in the layer 115 that will ultimately be nibs 15 is appreciably harder than prior art metal nibs 15 thereby making it relatively more wear resistant. Masking material is then deposited and the pattern for the array of lines of nibs 15 on the polysilicon metal layer 115 is defined (not shown). Then the excess polysilicon or metal in layer 115 is etched away leaving the array of lines of nibs 15 as shown in side view FIG. 7C. A second or top insulating oxide on dielectric layer 95 of $SiO_2$ or $Si_2N_3$ for passivation and abrasion resistance purposes is deposited over the nibs 15 and the exposed areas of the first dielectric layer 90 as shown in side view FIG. 7D. The oxides, such as $SiO_2$, in the first and second dielectric layer 90 and 95 may in fact be $SiO_2$ and not completely $SiO_2$. Accordingly, an optional step may be to densify said oxides thermally at a relatively high temperature through time with a predetermined application simultaneously of gaseous $O_2$ until the desired combination of glass-like $SiO_2$ and $Si_xO_y$ (SILOX) in the oxides is obtained thereby obtaining a more effective dielectric effect. By masking and etching according to a predetermined pattern, aperatures alternative with nibs 15 may be obtained (not shown) and conductive lines 120 (which are relatively thinner than the nibs 15 and thus less chip active) may be deposited over the bare silicon 85 substrate and across the $SiO_2$ 95 where they are connected to the nibs 15. The conductive lines 120 originating from contact pads 125 affixed to the supra described driver electrostatic system 110 having input lines 121 on the Si (85) as shown in top view FIG. 7E. It will be noted that the interconnecting grid 122 can be used for multiplexing M drivers to N nibs (e.g., $X=N/M=3$ nibs/driver). The waver 10 may be a singular writing head or multiple writing heads 10 requiring definition, and then sawing or scribe/breaking into appropriate individual chips or writing heads 10. A final step includes lapping or polishing the edges or points 105 of the nibs 15 as shown in FIG. 5 for straightness thereby insuring alignment for reduced wear in regards to the throughputted media spatially proximate thereto. The lateral combined nib and blank spatial dimension 92 is in this embodiment approximately 125 μm but may vary as required for charge size. It will be appreciated that although the writing head 10 may be chip singular, in fact for reasons of present economic and technical efficiency, it consists of multiple chips or 5 chips of 2.2 inches each in this embodiment in the dimension perpendicular to the throughputting of the print media such as paper 25. It will be noted that 5 chips of 2.2 inches gives 11 inches corresponding to a B-Form of 11×14 inches for media. If the latter is the case, each of the writing head chips 10 may be interconnected to write simultaneously as described and claimed in the cross-referenced application.

Figure 7E:
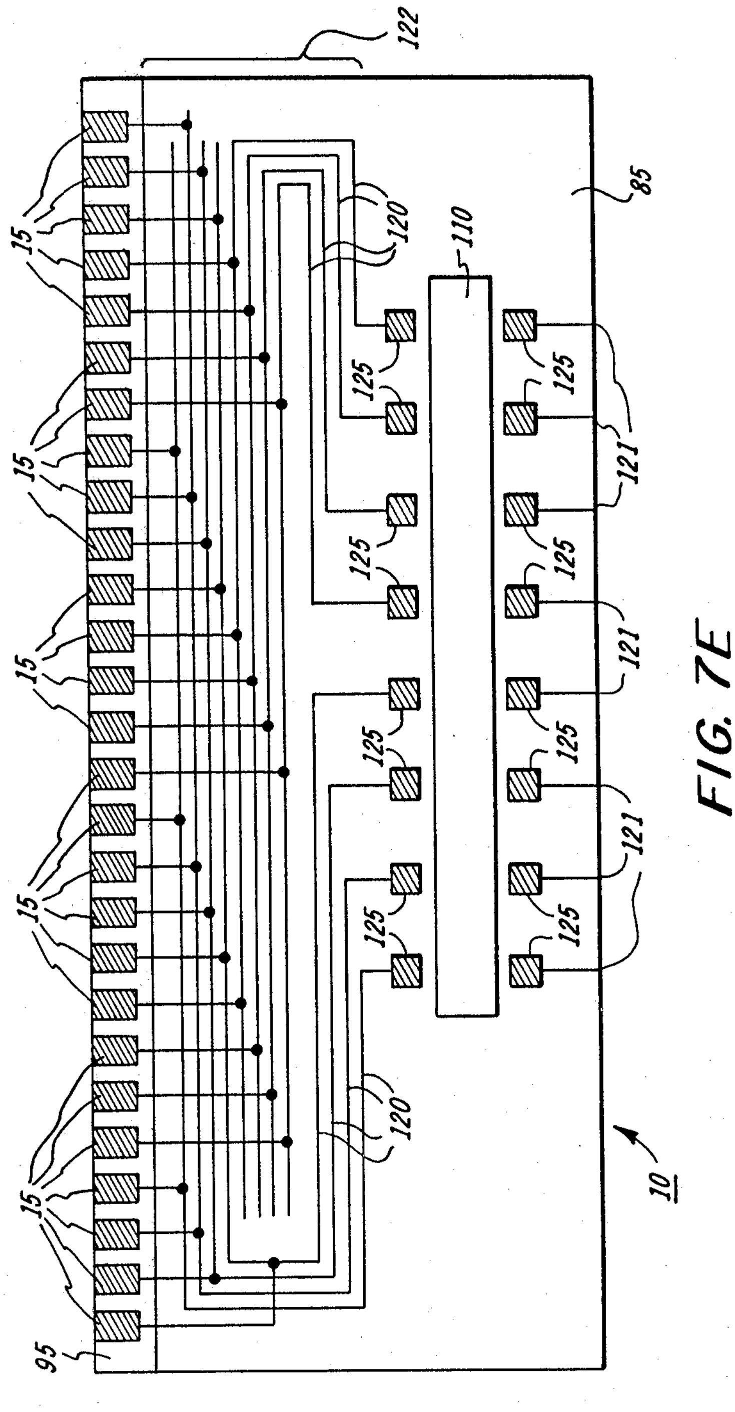
Figure 8:
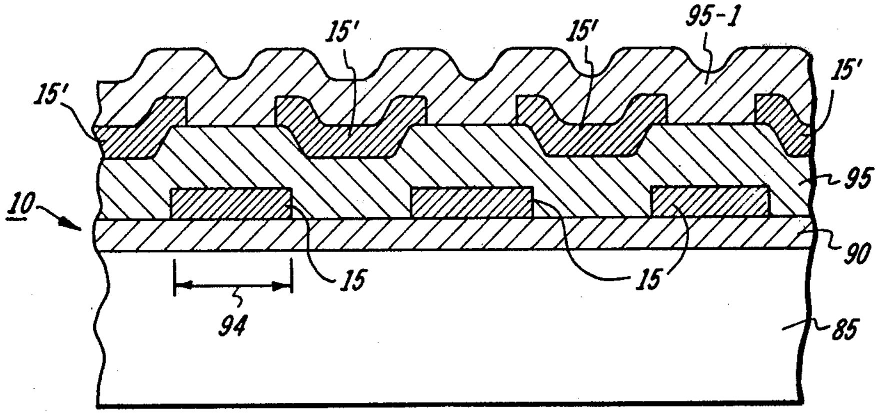
FIG. 8 is a cross-sectional view of a resolution 2 N single sided deposited nib array for the writing head structure of FIG. 1.

In an alternative embodiment where a 2 N resolution is required, it may so be obtained by the use of a uni-sided bi-layer polysilicon nib writing head structure 10 having deposition nibs 15 and 15' for double density resolution as shown in side view of FIG. 8. The process to obtain the above structure is identical up to and including densification step given supra for the previous process. Subsequent thereto, another conductive film such as a polysilicon or metal layer (not shown) is deposited over the second or top dielectric layer 95 for a second layer or array of nibs 15'. A pattern is again masked, defined and etched (not shown) leaving the second layer of nibs 15'. Next a new top or third layer of dielectric 95-1 such as $SiO_2$ or $Si_2N_3$ is deposited over the second layer of dielectric 95. Contacts 125 through condutor lines 120 to nibs 15 and 15' are again defined as shown in FIG. 7E. Likewise, definition and scribe/-breaking or sawing of wafers into chips for individual writing heads (not shown) is again completed. Finally, lapping/polishing of edges 120 of nibs 15 and 15' as shown in FIG. 7E is again done. Each of the arrays of nibs 15 and 15' is approximately 88 μm (94) (for a 288 DPi resolution) in this embodiment but may vary for charge size. As indicated supra, the end result is a double density or resolution nib 15 and 15' array for a write head structure 10. It will be appreciated that as shown in FIG. 8 that the nib array 15' is slightly overlapping with regard to array 15 which results in a slight overlapping in printing as shown supra at 80 in FIG. 3 thereby disallowing printing underlap. At the same time the alternating of nibs of array 15 with respect to nibs of array 15' maximum interspatial distance as between as two nibs 15 and/or 15' which along with the excellent dielectric properties of $SiO_2$, provides a high degree of internib isolation.

Figure 9:
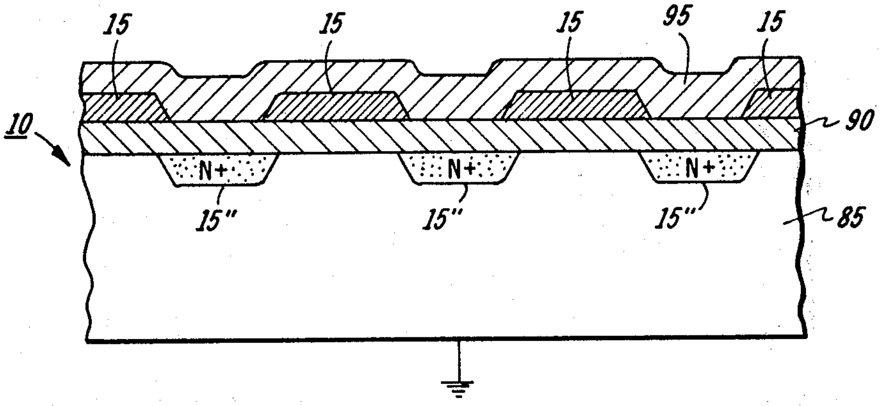
FIG. 9 is a cross-sectional view of a resolution 2 N single sided deposited and diffused nib array for the writing head structure of FIG. 1.

Another alternative embodiment having the end result of a 2 N resolution comprises a write head structure 10 having a layer of deposited nibs 15 and in addition a layer of diffused nibs 15''. The process used to obtain the above result is the same as the supra primary embodiment used to obtain an N resolution with the addition of a phosphorous diffusion step to obtain the diffused array of nibs 15'' as shown in FIG. 9. It will be appreciated that the phosphorous diffusion results in N+ doped nibs 15''. It will be further appreciated that the substrate 85 has been doped to be relatively P− thereby giving it relatively high resistivity. With the substrated 85 grounded as shown, the first array of diffused N+ nibs 15'' becomes reversed biased relative to the grounded P-substrate in that the interface between N+ nib 15'' and the substrate 85 functions as a reversed biased diode thereby providing excellent isolation therebetween when high voltage (e.g., 100-500 V.) pulses are applied to the nibs 15'' and 15 during printing resulting in precise printing. It will also be appreciated that this reversed biased interface will not as easily breakdown when high voltage is applied. It will further be noted that an additional advantage of having one of the nibs arrays diffused for a 2 N resolution/density is that the topography is relatively planar as compared to the supra structure having both layers of nibs deposited as can be seen in FIG. 8 versus FIG. 9. This results in a simpler process of forming the writing head 10 and less problems due to non-planar surface topography.

Figure 10:
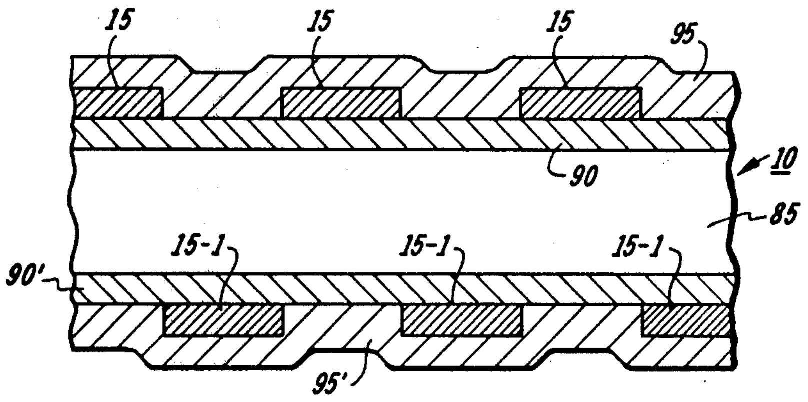
FIG. 10 is a cross-sectional view of a resolution N double sided deposited nib array for the writing head structure of FIG. 1.

In another alternative embodiment, the write head structure 10 can be a two sided or bi-sided deposited nib 15 and 15-1 configuration each side bearing unilayered nibs resulting in a 2 N resolution as shown in side view in FIG. 10. The process is identical to that shown for FIGS. 7A-E for each of the sides resulting in a doubling of density and a relatively planar topography for those embodiments requiring a two sided configuration. For the under nib layer 15-1, the first and second dielectric layers 90' and 95' are identical to those of the upper layer of nibs 15.

Figure 11:
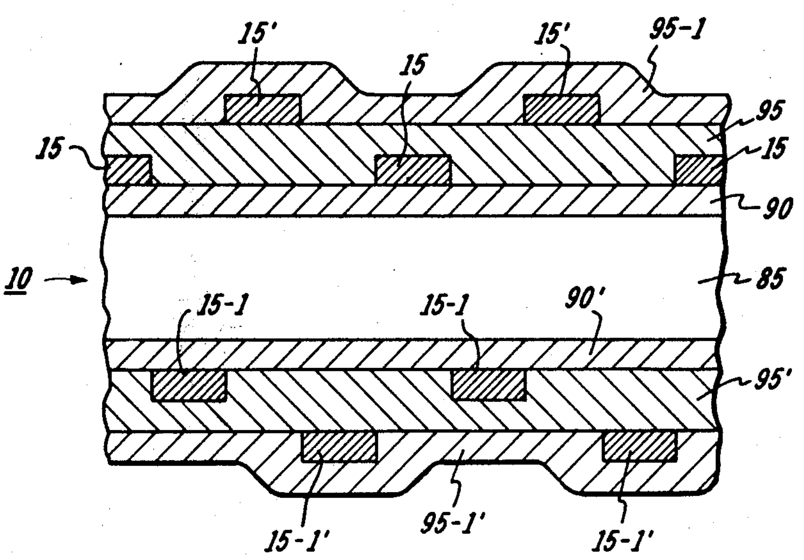
FIG. 11 is a cross-sectional view of a resolution 4 N double sided deposited nib array for the writing head structure of FIG. 1.

In those embodiments requiring 4 N resolution and where a relatively less planar topography is tolerable, a bi-sided bi-layered deposited nib writing head structure 10 may be used as shown in FIG. 11 with relatively the same process used in FIG. 8 except it is now two-sided. For the under nib layers 15-1 and 15-1', the first, second and third dielectric layers 90', 95' 95-1' and 95-1 are identical to those of the upper layer of nibs 15 and 15'. It will be appreciated that XN resolution/density may be required for a Y-sided Z-layered deposited and/or diffused nib configuration where X equals Y times Z assuming an increasingly non-planar surface topography can be tolerated in terms of trade-offs of resolution versus failure-rate in making the structures.

Although specific apparatus has been shown for the purpose of describing applicant's invention, it will be apparent to those skilled in the art that other variations and modifications in the specific structures illustrated may be made without departing from the spirit and scope of the invention which is limited only by the appended claims.

What is claimed is:

1. A stylus device for recording discrete electrostatic charges on a dielectric media moved in a plane past a surface of said device, said stylus device comprising:

a rigid substrate;

a first layer of dielectric material overlying at least a portion of a surface of said substrate;

a stylus array positioned at the exposed surface of said first layer of dielectric material, said stylus array being comprised of a plurality of electrically conductive stylii lying in a plane substantially orthogonal to said plane of movement of said media;

a second layer of dielectric material overlying said stylus array; and driver means coupled to each of said stylii for applying a voltage to selected ones of said stylii whereby electrostatic charges are recorded on portions of said media.

2. A stylus device for recording discrete electrostatic charges on a dielectric media moved in a plane past a surface of said device, said stylus device comprising:

a semiconductor substrate;

a first layer of dielectric material overlying at least a portion of a surface of said substrate;

a stylus array positioned at the exposed surface of said first layer of dielectric material, said stylus array being comprised of a plurality of electrically conductive stylii lying in a plane substantially orthogonal to said plane of movement of said media;

a second layer of dielectric material overlying said stylus array; and driver means formed within said substrate and coupled to each of said stylii for applying a voltage to selected ones of said stylii whereby electrostatic charges are recorded on portions of said media.

3. A stylus device for recording discrete electrostatic charges on a dielectric media moved in a plane past a surface of said device, said device comprising:

a substrate of semiconductor material of one conductivity type;

a stylus array formed at a surface of said substrate, said stylus array being comprised of a plurality of stylii regions of the other conductivity type lying in a plane substantially orthogonal to said plane of movement of said media;

a layer of dielectric material overlying said stylus array; and driver means formed within said substrate and coupled to each of said regions for applying a voltage to selected ones of said regions whereby electrostatic charges are recorded on portions of said media.

* * * * *